(12) United States Patent
Irie

(10) Patent No.: US 12,308,722 B2
(45) Date of Patent: May 20, 2025

(54) DRIVE DEVICE AND IMAGING APPARATUS

(71) Applicant: FUJIFILM Corporation, Tokyo (JP)

(72) Inventor: Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 238 days.

(21) Appl. No.: 17/936,151

(22) Filed: Sep. 28, 2022

(65) Prior Publication Data

US 2023/0135851 A1 May 4, 2023

(30) Foreign Application Priority Data

Oct. 28, 2021  (JP) ................................. 2021-176871

(51) Int. Cl.
*H02K 41/03* (2006.01)
*H02K 11/215* (2016.01)
*H04N 23/68* (2023.01)

(52) U.S. Cl.
CPC ......... *H02K 41/031* (2013.01); *H02K 11/215* (2016.01); *H04N 23/6812* (2023.01); *H04N 23/687* (2023.01)

(58) Field of Classification Search
CPC ............... H02K 41/031; H02K 11/215; H04N 23/6812; H04N 23/687
See application file for complete search history.

(56) References Cited

U.S. PATENT DOCUMENTS

| 11,330,209 | B2* | 5/2022 | Kimura | ............... | H02K 41/0356 |
| 2007/0092235 | A1* | 4/2007 | Misawa | ................. | H04N 23/68 |
| | | | | | 348/E5.046 |
| 2011/0001835 | A1* | 1/2011 | Awazu | ................. | H04N 23/687 |
| | | | | | 348/208.7 |
| 2011/0074963 | A1* | 3/2011 | Awazu | ................. | H04N 23/687 |
| | | | | | 348/208.4 |
| 2018/0205862 | A1* | 7/2018 | Ishikawa | ............... | H04N 23/687 |
| 2019/0165031 | A1 | 5/2019 | Shirata et al. | | |
| 2020/0225506 | A1* | 7/2020 | Awazu | ..................... | G03B 5/06 |
| 2021/0020680 | A1 | 1/2021 | Shirata et al. | | |
| 2022/0326047 | A1 | 10/2022 | Ku et al. | | |

FOREIGN PATENT DOCUMENTS

| JP | 2018-205585 A | 12/2018 |
| JP | 2019-102803 A | 6/2019 |
| JP | 2020-170962 A | 10/2020 |
| KR | 10-2020-0142877 A | 12/2020 |

OTHER PUBLICATIONS

An Office Action; "Notice of Reasons for Refusal," mailed by the Japanese Patent Office on Feb. 25, 2025, which corresponds to Japanese Patent Application No. 2021-176871 and is related to U.S. Appl. No. 17/936,151; with English language translation.

* cited by examiner

*Primary Examiner* — Forrest M Phillips
(74) *Attorney, Agent, or Firm* — Studebaker Brackett PLLC

(57) ABSTRACT

A drive device includes: a magnet; a coil and a position sensor each of which receives an action from the magnet; a first electrical wiring line that passes through the position sensor and causes first electromotive force to occur by causing an electric current to flow in the coil; a second electrical wiring line that causes second electromotive force, which is electromotive force in an opposite direction to the first electromotive force, to occur by causing the electric current to flow in the coil; and a processor configured to control the electric current flowing in the coil based on an output of the position sensor.

17 Claims, 10 Drawing Sheets

DRIVE DEVICE AND IMAGING APPARATUS

CROSS-REFERENCE TO RELATED APPLICATIONS

The present application claims priority under 35 U.S.C. § 119 to Japanese Patent Application No. 2021-176871, filed on Oct. 28, 2021. The above application is hereby expressly incorporated by reference, in its entirety, into the present application.

BACKGROUND OF THE INVENTION

1. Field of the Invention

The present invention relates to a drive device and an imaging apparatus.

2. Description of the Related Art

JP2019-102803A discloses a camera module including a semiconductor package using a hall element as a sensor for position detection, in which an effect of a leaking magnetic field on the sensor for position detection is reduced by, for example, arranging the sensor for position detection as far as possible from wiring lines for current supply or offsetting the leaking magnetic field by setting a direction of a flow of current in opposite directions between the pair of wiring lines for current supply.

JP2020-170962A discloses a shake correction device that is used in an electronic apparatus comprising an imaging element which outputs an image signal corresponding to an optical image formed through an imaging optical system, and that corrects a shake occurring in an image indicated by the image signal by moving the imaging element in a direction orthogonal to an optical axis of the imaging optical system.

JP2018-205585A discloses an optical unit with a shake correction function. The optical unit comprises a fixed body, a movable body that holds an optical element, a support mechanism that supports the movable body in a movable manner with respect to the fixed body, and a shake correction drive mechanism that moves the movable body. The shake correction drive mechanism is a magnetic drive mechanism including a magnet disposed in any one of the movable body or the fixed body, and a drive coil that is disposed in the other of the movable body or the fixed body and exerts electromagnetic force on the movable body within a magnetic field of the magnet. A magnetic detection element that detects displacement of the magnet caused by the electromagnetic force, and a cancelation coil that generates a magnetic flux capable of canceling a magnetic flux exerted on the magnetic detection element from the drive coil are disposed in a member in which the drive coil is disposed out of the movable body and the fixed body.

SUMMARY OF THE INVENTION

A drive device according to one embodiment of the disclosed technology comprises a magnet, a coil and a position sensor that receive an action from the magnet, a first electrical wiring line that passes through the position sensor and causes first electromotive force to occur by causing a current to flow in the coil, a second electrical wiring line that causes second electromotive force which is electromotive force in an opposite direction to the first electromotive force to occur by causing the current to flow in the coil, and a processor configured to control the current flowing in the coil based on an output of the position sensor.

A drive device according to another embodiment of the disclosed technology comprises a magnet, a coil and a position sensor that receive an action from the magnet, an electrical wiring line that passes through the position sensor and extends from an inner side of the coil to an outer side of the coil, and a processor configured to control a current flowing in the coil based on an output of the position sensor, in which electromotive force occurring by the electrical wiring line by causing the current to flow in the coil is less than or equal to a threshold value.

An imaging apparatus according to still another embodiment of the disclosed technology comprises the drive device.

DESCRIPTION OF THE PREFERRED EMBODIMENTS

Figure 1:
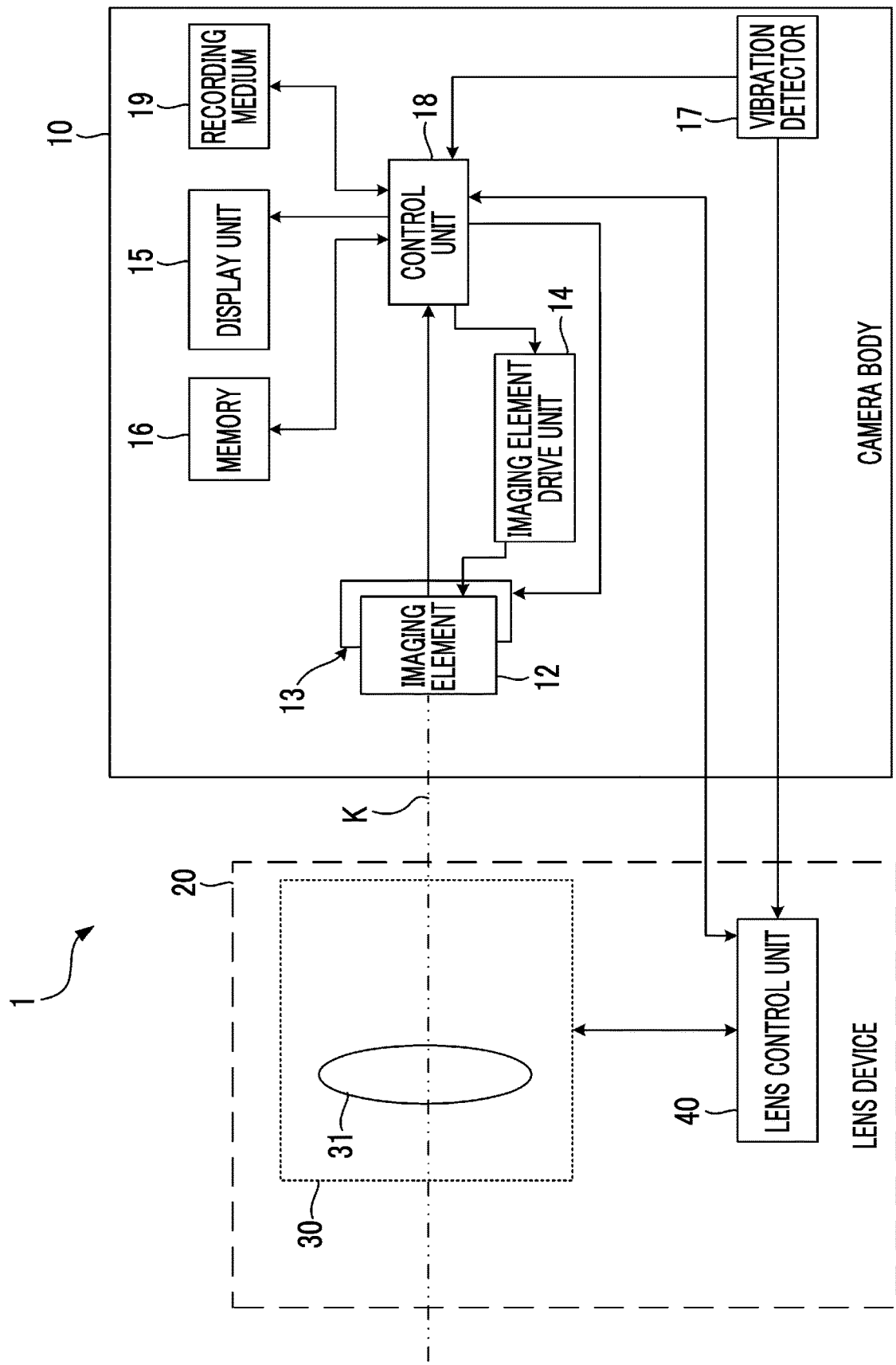
FIG. 1 is a diagram illustrating a schematic configuration of a digital camera 1 that is one embodiment of an imaging apparatus according to the present invention.

FIG. 1 is a diagram illustrating a schematic configuration of a digital camera 1 that is one embodiment of an imaging apparatus according to the present invention. The digital camera 1 comprises a camera body 10 and a lens device 20. The lens device 20 is attachably and detachably, in other words, interchangeably, configured with respect to the camera body 10. The lens device 20 may be integrated with the camera body 10.

The lens device 20 includes an imaging optical system 30 and a lens control unit 40. The imaging optical system 30 comprises an imaging lens 31 and a stop mechanism and the like, not illustrated. For example, the imaging lens 31 is composed of a single lens or a plurality of lenses including a lens for adjusting a focal point of the imaging optical system 30. The lens control unit 40 is mainly configured with a processor and controls driving of the imaging optical system 30 under control of a control unit 18, described later.

The camera body 10 comprises an imaging element 12, an imaging element shift mechanism 13, an imaging element drive unit 14, a display unit 15 that is a display device such as a liquid crystal display or an organic electro luminescence (EL) display, a memory 16 including a random access memory (RAM) as a volatile memory in which information is temporarily recorded, a read only memory (ROM) as a non-volatile memory in which a program and various information necessary for an operation of the program are recorded in advance, and the like, a vibration detector 17, the control unit 18, and a recording medium 19 such as a memory card configured with a non-volatile memory.

The imaging element 12 images a subject through the imaging optical system 30. The imaging element 12 is configured with a charge coupled device (CCD) image sensor, a complementary metal oxide semiconductor (CMOS) image sensor, or the like.

The imaging element shift mechanism 13 is a mechanism for preventing a shake (image shake) of an image captured by the imaging element 12 by moving the imaging element 12 in a plane perpendicular to an optical axis K of the imaging optical system 30.

The vibration detector 17 is a sensor for detecting a motion of the digital camera 1. The vibration detector 17 is configured with, for example, an acceleration sensor or an angular velocity sensor or both thereof. The vibration detector 17 may be disposed in the lens device 20.

The control unit 18 manages and controls the entire digital camera 1. A hardware structure of the system control unit 18 corresponds to various processors that perform processing by executing programs.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific type of processing like an application specific integrated circuit (ASIC). More specifically, a structure of the various processors is an electric circuit in which circuit elements such as semiconductor elements are combined. The control unit 18 may be configured with one of the various processors or may be configured with a combination of two or more processors of the same type or different types (for example, a combination of a plurality of FPGAs or a combination of a CPU and an FPGA).

The control unit 18 causes the imaging element 12 to image the subject by controlling the imaging element drive unit 14 and outputs a captured image signal corresponding to the subject image formed in a light-receiving region of the imaging element 12 from the imaging element 12. The control unit 18 generates an image of a format such as Joint Photographic Experts Group (JPEG) format reproducible by the digital camera 1 or another apparatus by performing image processing on the captured image signal output from the imaging element 12.

In imaging the subject by the imaging element 12, the control unit 18 corrects the image shake by controlling the imaging element shift mechanism 13 based on vibration information (angular velocity or the like) of the digital camera 1 detected by the vibration detector 17 to move the imaging element 12 in the plane perpendicular to the optical axis K.

Figure 2:
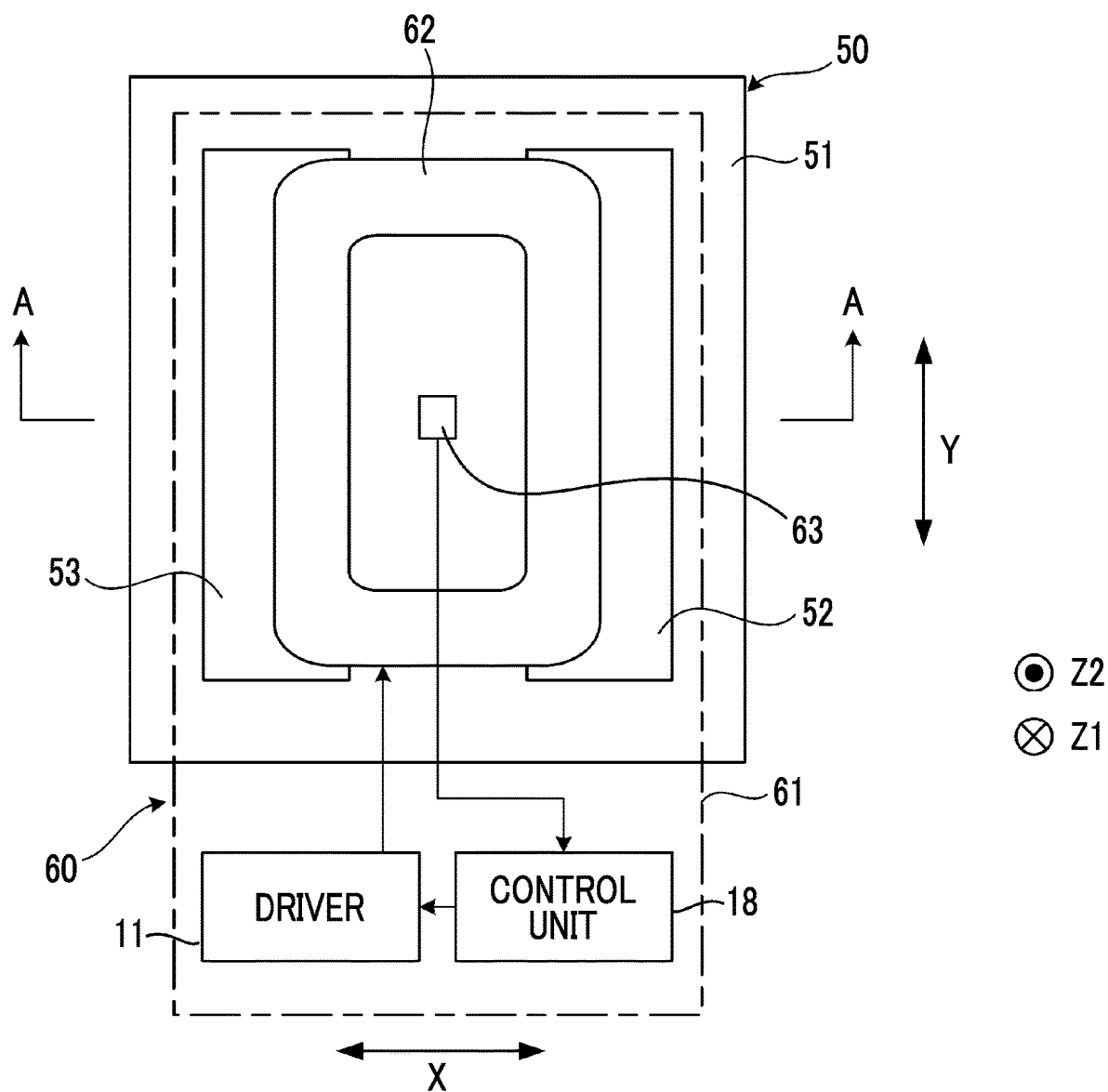
FIG. 2 is a schematic diagram partially illustrating a schematic configuration of an imaging element shift mechanism 13 in the digital camera 1 illustrated in FIG. 1.
Figure 3:
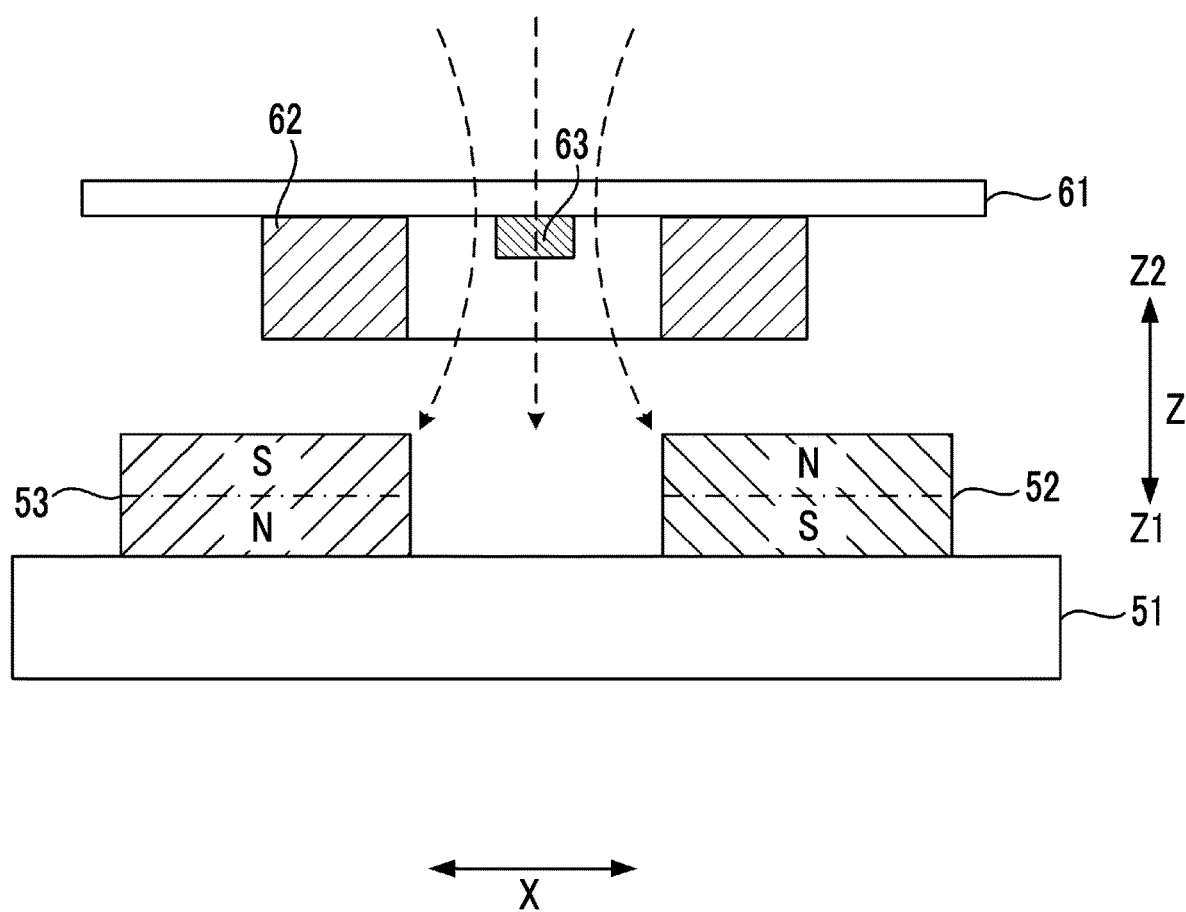
FIG. 3 is a schematic cross-sectional view along arrow A-A in FIG. 2.

FIG. 2 is a schematic diagram partially illustrating a schematic configuration of the imaging element shift mechanism 13 in the digital camera 1 illustrated in FIG. 1. FIG. 3 is a schematic cross-sectional view along arrow A-A in FIG. 2. In FIG. 2, two directions that are orthogonal to each other and pass through the plane (hereinafter, referred to as an XY plane) perpendicular to the optical axis K of the imaging optical system 30 are illustrated as a direction X and a direction Y. In addition, hereinafter, a direction along the optical axis K will be referred to as a direction Z. One direction (direction from the front to the back of the page in FIG. 2) of the direction Z will be referred to as a direction Z1, and the other direction (direction from the back to the front of the page in FIG. 2) of the direction Z will be referred to as a direction Z2.

The imaging element shift mechanism 13 comprises a fixed unit 50 of which a position in the digital camera 1 is not changed, and a movable unit 60 that can move in the direction X with respect to the fixed unit 50. While illustration is not provided, the imaging element shift mechanism 13 further includes another fixed unit corresponding to the fixed unit 50 and a movable unit that corresponds to the movable unit 60 and can move in the direction Y with respect to the other fixed unit.

The fixed unit 50 comprises a plate-shaped flat member 51 that has a thickness direction matching the direction Z and is parallel to the XY plane, and a magnet 52 and a magnet 53 that extend in the direction Y and are arranged at an interval in the direction X on a surface of the flat member 51 on a direction Z2 side. The magnet 52 is fixed to the flat member 51 in a state where an N pole faces the direction Z2 side. The magnet 53 is fixed to the flat member 51 in a state where an S pole faces the direction Z2 side.

The movable unit 60 comprises a support member, not illustrated, that supports the imaging element 12, and a flexible substrate 61 having a flat surface region that faces the flat member 51 and is parallel to the XY plane. The flexible substrate 61 is fixed to the support member, and moving the flexible substrate 61 in the direction X also moves the imaging element 12 supported by the support member.

In FIG. 2, the flexible substrate 61 is illustrated as being transparent using an imaginary line for understanding of the configuration. A driving coil 62 for moving the movable unit 60 in the direction X and a position sensor 63 for detecting a position of the movable unit 60 in the XY plane are mounted on a surface of the flat surface region of the flexible substrate 61 on a direction Z1 side. An axial direction of the driving coil 62 matches the direction Z. The position sensor 63 is arranged on an inner side of the driving coil 62. The position sensor 63 is configured with a hall element. A magnetic sensor other than a hall element may also be used as the position sensor 63 as long as a position of the movable unit 60 can be detected based on a change in magnetic force supplied from a magnet.

As illustrated in FIG. 2, the control unit 18 and a driver 11 that performs a supply control of power to the driving coil 62 are further mounted in the flat surface region of the flexible substrate 61. The control unit 18 and the position sensor 63 are connected by an electrical wiring line, described later, formed in the flexible substrate 61. The control unit 18 performs an image shake correction control of deciding a target position of the movable unit 60 based on the vibration information detected by the vibration detector 17 and moving the movable unit 60 to the target position by controlling the driver 11 so that the position of the movable unit 60 detected based on an output of the position sensor 63 matches the target position. The control unit 18 and the driver 11 may be mounted on another substrate connected to the flexible substrate 61 through a connector.

The driving coil 62, the magnet 52, and the magnet 53 constitute a voice coil motor. The flexible substrate 61 can be moved in the direction X with respect to the fixed unit 50 by supplying a current to the driving coil 62 from the driver 11. The position sensor 63 outputs a signal corresponding to magnetic force from an N pole of the magnet 52 to an S pole of the magnet 53. Since the magnetic force detected by the position sensor 63 changes depending on a position of the position sensor 63, the position of the movable unit 60 can be detected based on the output of the position sensor 63. A magnetic field formed by the magnet 52 and the magnet 53 is configured to act on both of the driving coil 62 and the position sensor 63. In the present embodiment, size reduction of the imaging element shift mechanism 13 is achieved by performing both of driving of the movable unit 60 and position detection of the movable unit 60 using the common magnet 52 and magnet 53.

A broken line arrow illustrated in FIG. 3 illustrates a magnetic flux line (hereinafter, referred to as a coil magnetic flux line) that is generated from the driving coil 62 in a case where a current flowing counterclockwise in FIG. 2 is supplied to the driving coil 62 from the driver 11. The coil magnetic flux line passing through the flexible substrate 61 advances toward the direction Z1 on the inner side of an outer edge of the driving coil 62 as illustrated in FIG. 3, and advances in the opposite direction toward the direction Z2 on an outer side of the outer edge of the driving coil 62. In a case where the current flowing in the driving coil 62 is set in the opposite direction, the coil magnetic flux line is set in the opposite direction. In the present specification, the direction Z is defined as the direction of the coil magnetic flux line passing through the driving coil 62.

Figure 4:
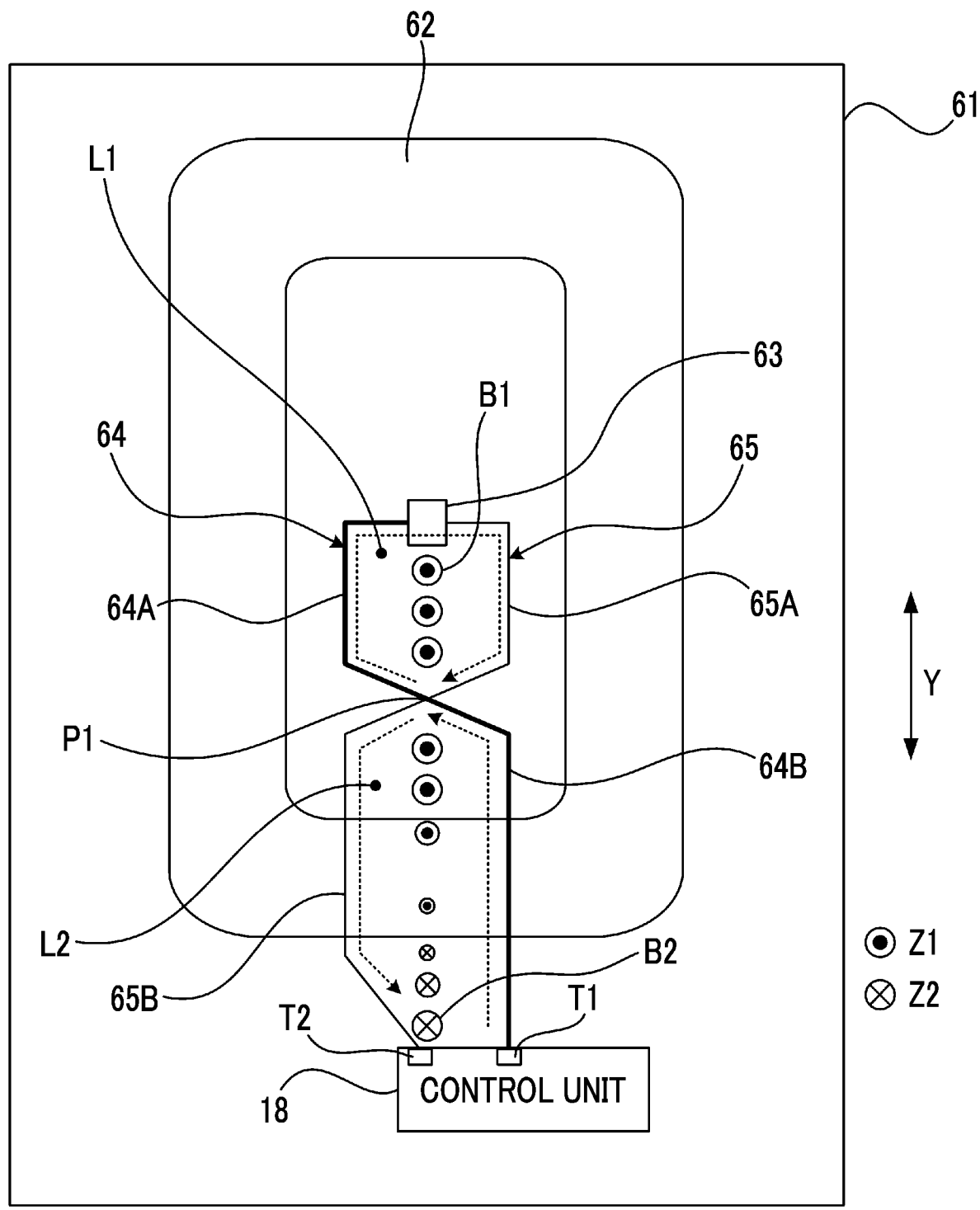
FIG. 4 is a schematic diagram of a movable unit 60 illustrated in FIG. 2 in a view in a direction Z2.

FIG. 4 is a schematic diagram of the movable unit 60 illustrated in FIG. 2 in a view in the direction Z2. In FIG. 4, the driver 11 is not illustrated. As illustrated in FIG. 4, the control unit 18 and the position sensor 63 are connected by an electrical wiring line 64 and an electrical wiring line 65 formed in the flexible substrate 61. The electrical wiring line 64 and the electrical wiring line 65 are differential output wiring lines of the hall element constituting the position sensor 63.

The electrical wiring line 64 connects one of two differential output terminals of the position sensor 63 to an input terminal T1 of the control unit 18. The flexible substrate 61 has a structure of a plurality of layers. For example, the electrical wiring line 64 is formed in the upper most layer.

The electrical wiring line 65 connects the other of the two differential output terminals of the position sensor 63 to an input terminal T2 of the control unit 18. The electrical wiring line 65 is formed in a layer below the layer in which the electrical wiring line 64 is formed.

The electrical wiring line 64 and the electrical wiring line 65 cross at one point P1 in the plan view illustrated in FIG. 4. The electrical wiring line 64 is configured with a wiring line region 64A between the point P1 and the position sensor 63 and a wiring line region 64B between the point P1 and the input terminal T1. The electrical wiring line 65 is configured with a wiring line region 65A between the point P1 and the position sensor 63 and a wiring line region 65B between the point P1 and the input terminal T2.

In a state of a view in the direction Z, it can be said that a first loop pattern (pattern forming a closed region L1) that may function as a single-turn coil is formed by the wiring line region 64A, the wiring line region 65A, and the position sensor 63 in the flexible substrate 61. In addition, in a state of a view in the direction Z, it can be said that a second loop pattern (pattern forming a closed region L2) that may function as a single-turn coil is formed by the wiring line region 64B, the wiring line region 65B, and the control unit 18 in the flexible substrate 61.

Here, a state that does not occur in actuality and is a state of causing the current to flow to the input terminal T2 from the input terminal T1 of the control unit 18 via the position sensor 63 is assumed. In this case, the direction of the current flowing in the first loop pattern is clockwise in FIG. 4 as illustrated by a broken line arrow in FIG. 4. On the other hand, the direction of the current flowing in the second loop pattern is counterclockwise in FIG. 4 as illustrated by a broken line arrow in FIG. 4. In this assumed state, in a case where the direction of the current flowing in each loop pattern is defined as a turn direction of a single-turn coil forming each loop pattern, the turn direction of the single-turn coil constituting the first loop pattern and the turn direction of the single-turn coil constituting the second loop pattern are opposite to each other.

In FIG. 4, coil magnetic flux lines (a coil magnetic flux line B1 and a coil magnetic flux line B2) that pass through the flexible substrate 61 in a case where the current flows in the driving coil 62 are illustrated. The coil magnetic flux line B1 illustrates a magnetic flux line advancing in the direction Z1, a size of the coil magnetic flux line B1 indicates strength. The coil magnetic flux line B2 illustrates a magnetic flux line advancing in the direction Z2, a size of the coil magnetic flux line B2 indicates strength.

The first loop pattern is arranged on an inner side of the driving coil 62. Thus, only the coil magnetic flux line B1 passes through the closed region L1. The second loop pattern is arranged to extend from the inner side of the driving coil 62 to the outer side of the driving coil 62. Thus, the coil magnetic flux line B1 and the coil magnetic flux line B2 pass through the closed region L2. In the present embodiment, the first loop pattern and the second loop pattern are configured such that a magnetic flux $\varphi_{L1}$ in the closed region L1 indicating an integrated value of the coil magnetic flux line passing through the closed region L1 approximately matches a magnetic flux $\varphi_{L2}$ in the closed region L2 indicating an integrated value of the coil magnetic flux line passing through the closed region L2. Approximate matching between two magnetic fluxes means that an absolute value of a difference between the two magnetic fluxes is less than or equal to a threshold value (ideally zero). This threshold value is appropriately decided as a value that does not affect position detection accuracy of the position sensor 63.

The magnetic flux $\varphi_{L2}$ in the closed region L2 is an integrated value of a product of a magnetic flux density IN of a part on the inner side of the outer edge of the driving coil 62 out of the closed region L2 and an area of this part, and a product of a magnetic flux density OUT of a part on the outer side of the outer edge of the driving coil 62 out of the closed region L2 and an area of this part. It should be noted that reference numerals of the magnetic flux density IN and the magnetic flux density OUT are different.

A coil magnetic flux line passes through the closed region L1 by causing the current to flow in the driving coil 62. However, in a case where the coil magnetic flux line is changed, first electromotive force occurs in the first loop pattern. The first electromotive force corresponds to the magnetic flux $\varphi_{L1}$ in the closed region L1. The wiring line region 64A and the wiring line region 65A constitute a first electrical wiring line that causes the first electromotive force to occur by causing the current to flow in the driving coil 62.

Similarly, a coil magnetic flux line passes through the closed region L2 by causing the current to flow in the driving coil 62. However, in a case where the coil magnetic flux line is changed, second electromotive force occurs in the second loop pattern. The second electromotive force is in the opposite direction to the first electromotive force. In addition, the second electromotive force corresponds to the magnetic flux $\varphi_{L2}$ in the closed region L2. The wiring line region 64B and the wiring line region 65B constitute a second electrical wiring line that causes the second electromotive force to occur by causing the current to flow in the driving coil 62.

By approximately matching the magnetic flux $\varphi_{L1}$ and the magnetic flux $\varphi_{L2}$ as described above, the first electromotive force and the second electromotive force can be approximately matched. Consequently, the first electromotive force occurring in the electrical wiring line connecting the position sensor 63 to the control unit 18 can be canceled out by the second electromotive force occurring in the electrical wiring line. Accordingly, in a case where the current flows in the driving coil 62, electromotive force occurring in the electrical wiring line can be minimized, and the electromotive force is unlikely to affect detection performance of the position sensor 63 compared to a case where the electromotive force is large. Consequently, the position detection accuracy of the movable unit 60 can be improved.

Figure 5:
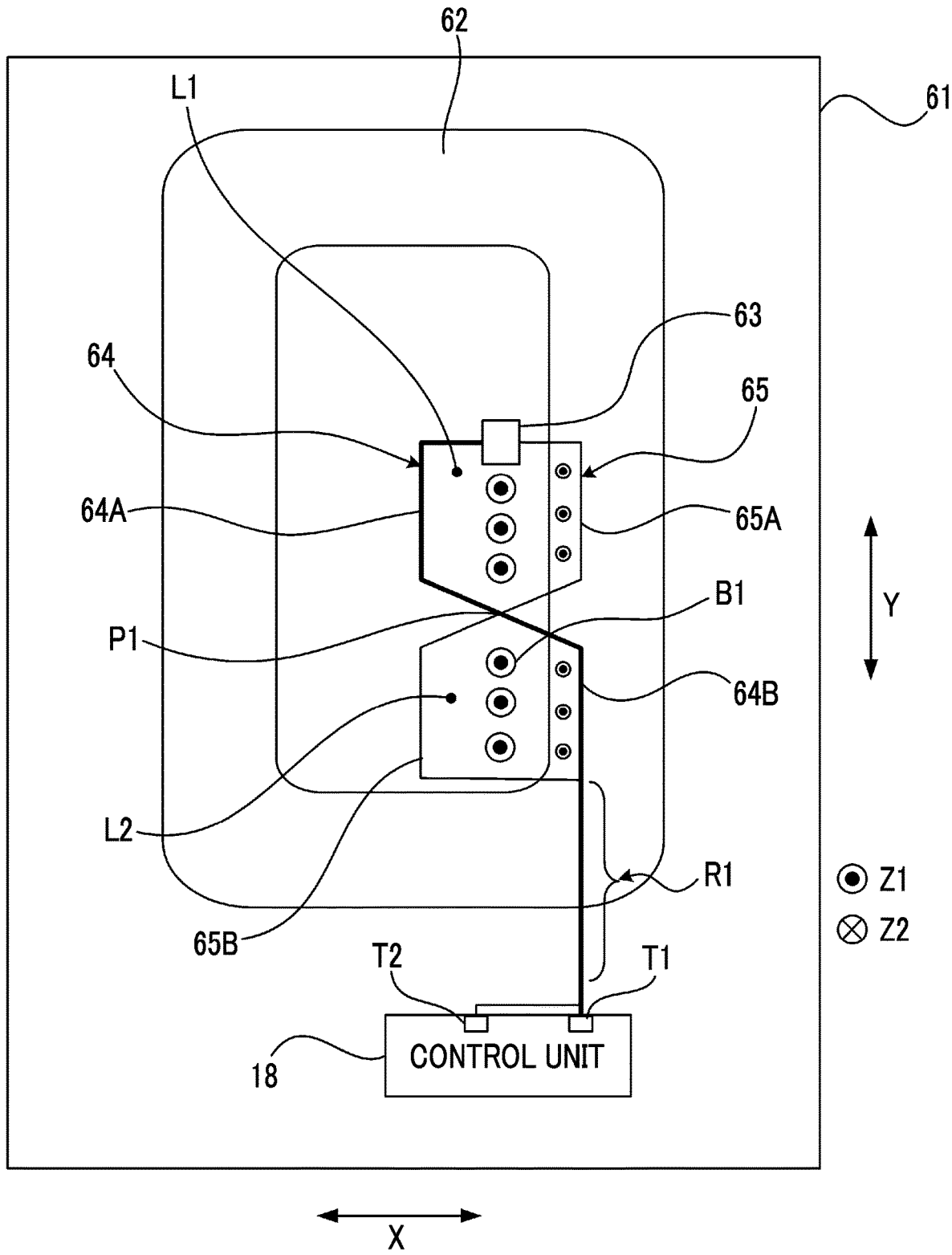
FIG. 5 is a schematic diagram that illustrates a first modification example of an electrical wiring line connecting a position sensor 63 to a control unit 18 and corresponds to FIG. 4.

FIG. 5 is a schematic diagram that illustrates a first modification example of the electrical wiring line connecting the position sensor 63 to the control unit 18 and corresponds to FIG. 4. FIG. 5 is different from FIG. 4 in that the position sensor 63, the control unit 18, the electrical wiring line 64, and the electrical wiring line 65 are shifted to a right side of the direction X, and a part of the wiring line region 65B overlaps with the wiring line region 64B in a range R1.

In the modification example illustrated in FIG. 5, the closed region L2 is formed by a part from an end of the range R1 on an opposite side from a control unit 18 side to the point P1 out of the wiring line region 65B and a part from an end of the range R1 on an opposite side from the control unit 18 side to the point P1 out of the wiring line region 64B. In the modification example illustrated in FIG. 5, the closed region L1 and the closed region L2 have an axially symmetric shape about a straight line extending in the direction X through the point P1, and areas of the closed region L1 and the closed region L2 approximately match. In addition, one end part of each of the closed region L1 and the closed region L2 in the direction X overlaps with the driving coil 62. Approximate matching between two areas means that an absolute value of a difference between the two areas is less than or equal to a threshold value (ideally zero). This threshold value is appropriately decided as a small value that does not affect the position detection accuracy of the position sensor 63.

In the modification example in FIG. 5, a strength distribution (magnetic flux density) of the coil magnetic flux line in a region on the inner side of the outer edge of the driving coil 62 is constant in the direction Y at the same position in the direction X. The closed region L1 and the closed region L2 are at the same position in the direction X and are at different positions in only the direction Y. Furthermore, areas of the closed region L1 and the closed region L2 approximately match. Thus, the magnetic flux $\varphi_{L1}$ of the closed region L1 approximately matches the magnetic flux $\varphi_{L2}$ of the closed region L2. Accordingly, as in the configuration in FIG. 4, in a case where the current flows in the driving coil 62, electromotive force that may occur in the electrical wiring line 64 and the electrical wiring line 65 can be minimized, and the position detection accuracy of the movable unit 60 can be improved.

Figure 6:
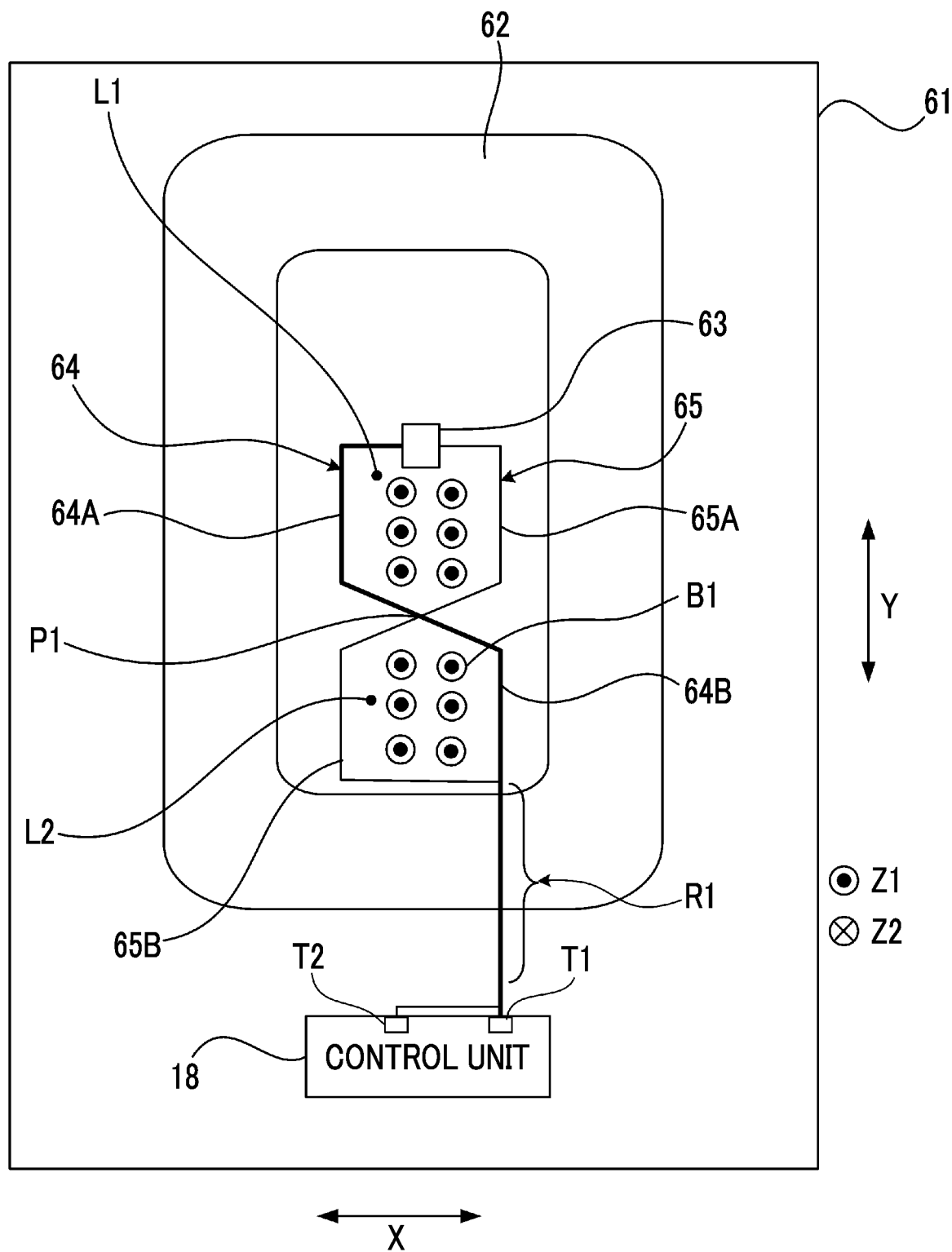
FIG. 6 is a schematic diagram that illustrates a second modification example of the electrical wiring line connecting the position sensor 63 to the control unit 18 and corresponds to FIG. 4.

FIG. 6 is a schematic diagram that illustrates a second modification example of the electrical wiring line connecting the position sensor 63 to the control unit 18 and corresponds to FIG. 4. FIG. 6 is different from FIG. 5 only in that the position sensor 63, the control unit 18, the electrical wiring line 64, and the electrical wiring line 65 are shifted to a left side, and the first loop pattern and the second loop pattern are arranged on the inner side of the driving coil 62. According to the modification example in FIG. 6, the position detection accuracy of the movable unit 60 can be improved as in the configuration in FIG. 5. In addition, according to the modification examples in FIG. 5 and FIG. 6, an area of a loop pattern can be minimized, and wiring line design can be easily performed. Thus, a manufacturing cost can be reduced.

Figure 7:
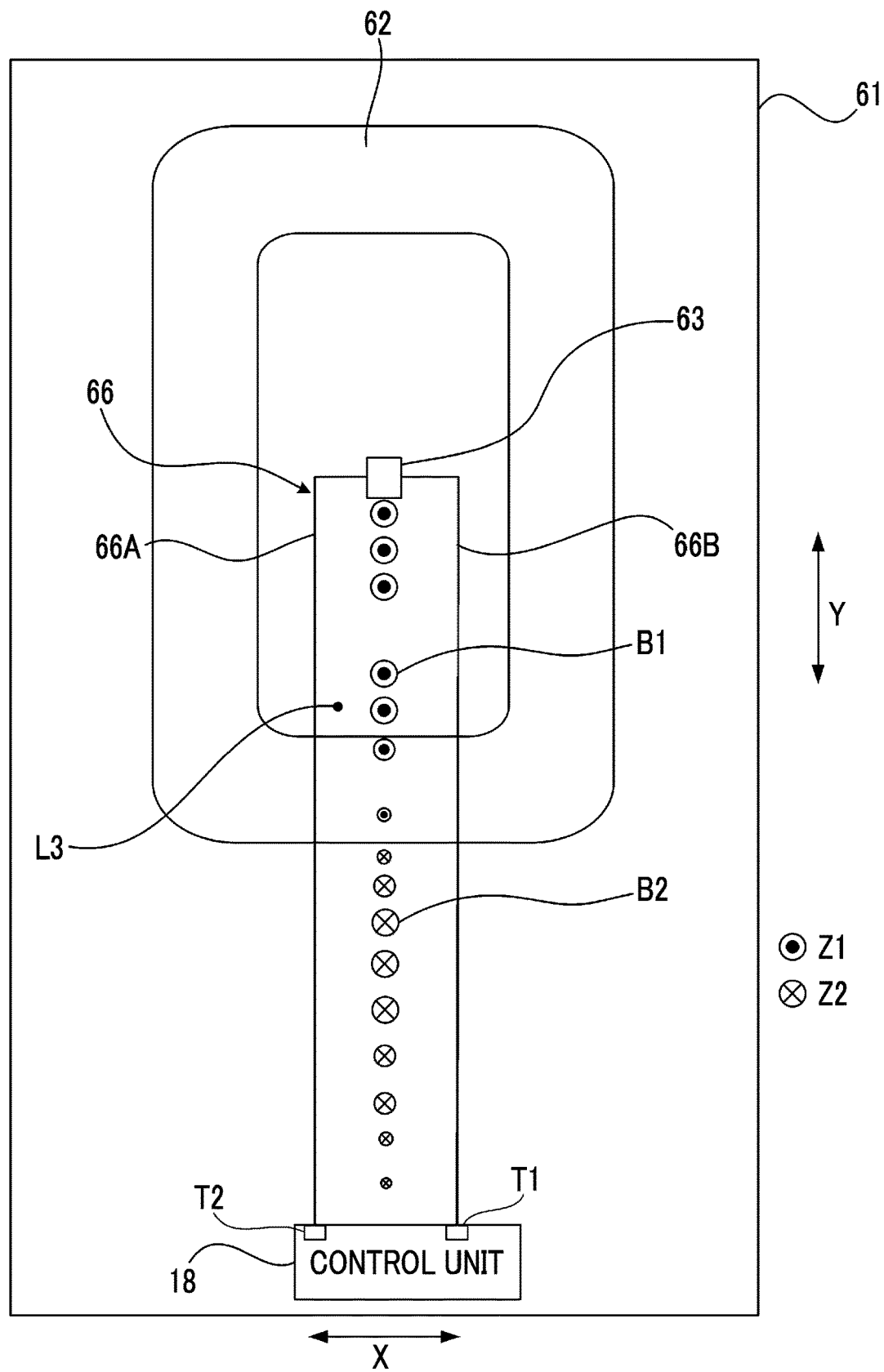
FIG. 7 is a schematic diagram that illustrates a third modification example of the electrical wiring line connecting the position sensor 63 to the control unit 18 and corresponds to FIG. 4.

FIG. 7 is a schematic diagram that illustrates a third modification example of the electrical wiring line connecting the position sensor 63 to the control unit 18 and corresponds to FIG. 4. In the modification example in FIG. 7, an electrical wiring line 66 that is formed to extend from the inner side of the driving coil 62 to the outer side of the driving coil 62 is formed in the flexible substrate 61 instead of the electrical wiring line 64 and the electrical wiring line 65.

The electrical wiring line 66 is configured with a wiring line 66A that connects one of the two differential output terminals of the position sensor 63 to the input terminal T2 of the control unit 18, and a wiring line 66B that connects the other of the two differential output terminals of the position sensor 63 to the input terminal T1 of the control unit 18.

In the modification example illustrated in FIG. 7, in a state of a view in the direction Z, it can be said that a loop pattern PT (pattern forming a closed region L3) that may function as a single-turn coil is formed by the wiring line 66A, the wiring line 66B, the position sensor 63, and the control unit 18 in the flexible substrate 61.

A magnetic flux $\varphi_{L3}$ in the closed region L3 is an integrated value of a magnetic flux $\varphi_{L3a}$ of a part on the inner side of the outer edge of the driving coil 62 out of the closed region L3 and a magnetic flux ($\varphi_{ub}$ of a part on the outer side of the outer edge of the driving coil 62 out of the closed region L3. A first area of a region of the loop pattern PT on the outer side of the driving coil 62 and a second area of a region of the loop pattern PT on the inner side of the outer edge of the driving coil 62 are decided such that the magnetic flux $\varphi_{L3}$ is less than or equal to a threshold value (preferably zero). Specifically, the first area is larger than the second area. This threshold value is appropriately decided as a small value that does not affect the position detection accuracy of the position sensor 63.

In the modification example illustrated in FIG. 7, a coil magnetic flux line passes through the closed region L3 by causing the current to flow in the driving coil 62. However, in a case where the coil magnetic flux line is changed, electromotive force occurs in the loop pattern PT. This electromotive force depends on the magnetic flux $\varphi_{L3}$ in the closed region L3. However, the magnetic flux $\varphi_{L3}$ is less than or equal to the threshold value. Thus, the electromotive force occurring by the electrical wiring line 66 by causing the current to flow in the driving coil 62 is less than or equal to the threshold value (preferably zero). This threshold value is appropriately decided as a small value that does not affect the position detection accuracy of the position sensor 63. According to this modification example, an increase in the electromotive force occurring in the electrical wiring line 66 can be prevented, and the electromotive force is unlikely to affect the detection performance of the position sensor 63 compared to a case where the electromotive force is large. Consequently, the position detection accuracy of the movable unit 60 can be improved.

According to the modification example illustrated in FIG. 7, the electrical wiring line 66 can be formed in the same layer as the flexible substrate 61. Thus, a degree of freedom in wiring line design is increased compared to the examples in FIG. 4 to FIG. 6, and the manufacturing cost can be decreased.

The magnet 52, the magnet 53, the driving coil 62, the position sensor 63, the electrical wiring line 64, the electrical wiring line 65, and the control unit 18 or the magnet 52, the magnet 53, the driving coil 62, the position sensor 63, the electrical wiring line 66, and the control unit 18 described so far constitute a drive device.

Next, a configuration of a smartphone that is another embodiment of the imaging apparatus according to the present invention will be described.

Figure 8:
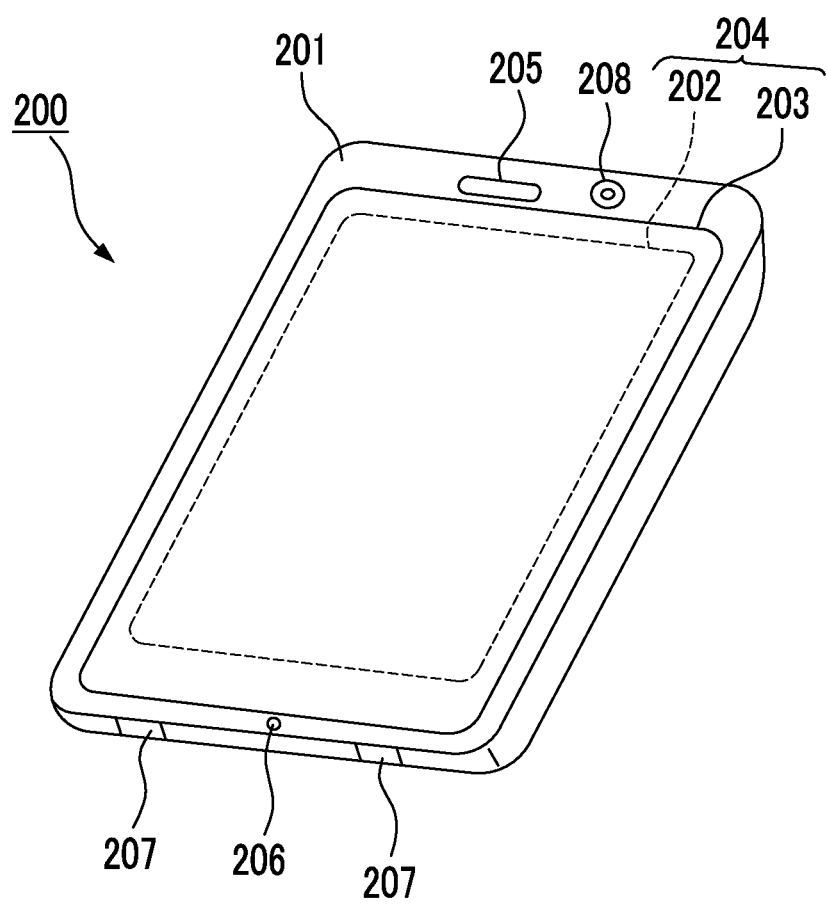
FIG. 8 illustrates an exterior of a smartphone 200.

FIG. 8 illustrates an exterior of a smartphone 200. The smartphone 200 illustrated in FIG. 8 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 9:
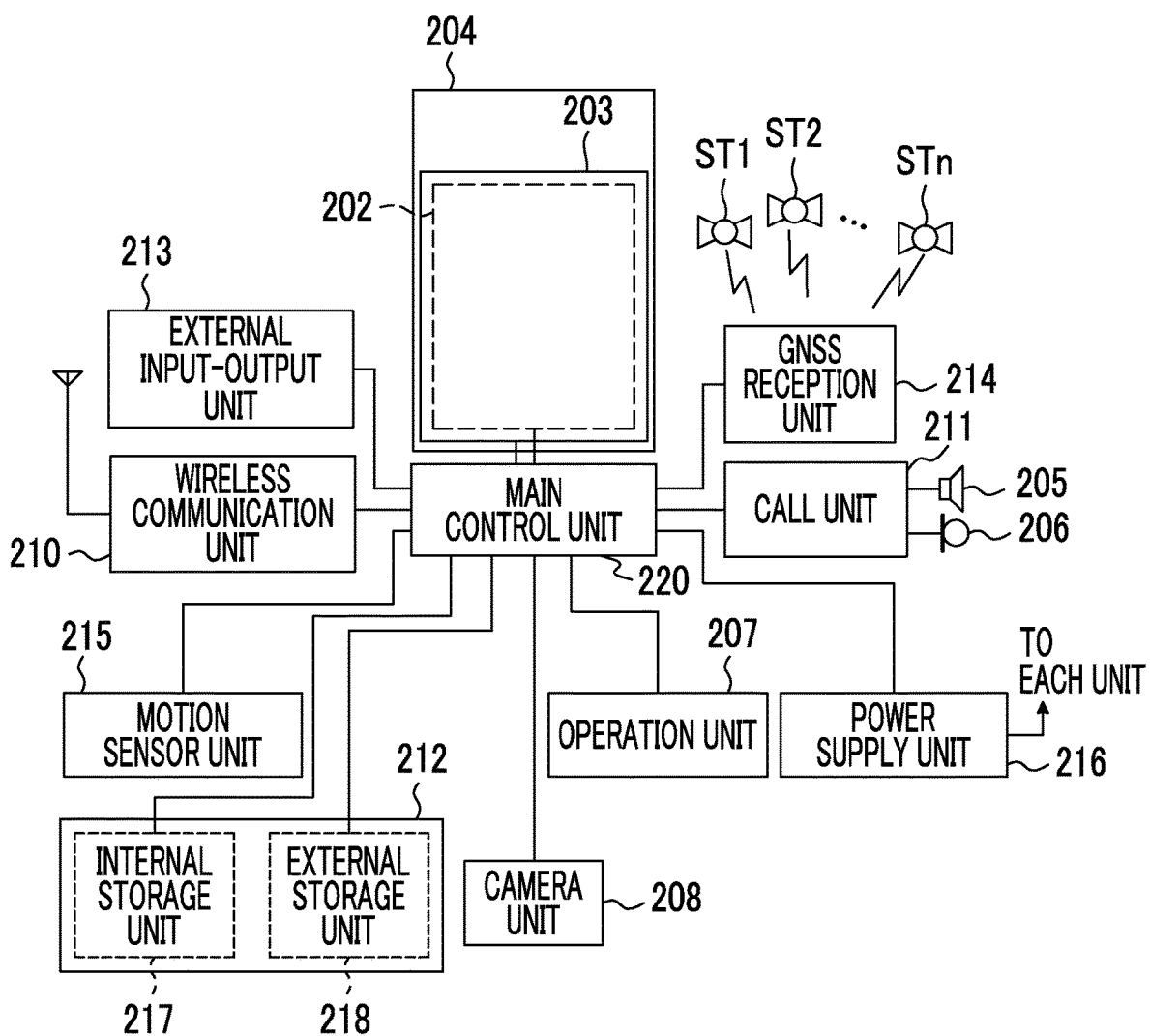
FIG. 9 is a block diagram illustrating a configuration of the smartphone 200 illustrated in FIG. 8.

FIG. 9 is a block diagram illustrating a configuration of the smartphone 200 illustrated in FIG. 8.

As illustrated in FIG. 9, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 9, while the display panel 202 and the operation panel 203 of the smartphone 200 illustrated as the imaging apparatus according to one embodiment of the present invention are integrated and constitute the display and input unit 204, the operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge portion other than the overlapping part that does not overlap with the display panel 202.

A size of the display region and a size of the display panel 202 may completely match, but both sizes do not need to match. In addition, the operation panel 203 may comprise two sensitive regions of the outer edge portion and an inner part other than the outer edge portion. Furthermore, a width of the outer edge portion is appropriately designed depending on a size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 8, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 8, the operation unit 207 is a push-button type switch that is mounted on a side surface of the casing 201 of the smartphone 200 and is set to an ON state in a case where the switch is pressed by the finger or the like, and set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, the Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation based on the received plurality of GNSS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. A detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. The microprocessor of the main control unit 220 has the same function as the control unit 18. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying an image on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes a display control for the display panel 202 and an operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 is provided with a touch panel control function of determining whether the operation position on the operation panel 203 is in the overlapping part (display region) overlapping with the display panel 202 or the other edge part (non-display region) not overlapping with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes the lens device 20, the imaging element 12, the imaging element shift mechanism 13, the imaging element drive unit 14, and the vibration detector 17 illustrated in FIG. 1.

Captured image data generated by the camera unit 208 can be stored in the storage unit 212 or be output through the external input-output unit 213 or the wireless communication unit 210.

In the smartphone 200 illustrated in FIG. 9, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GNSS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or by using the three-axis acceleration sensor together. The image from the camera unit 208 can also be used in the application software.

Besides, image data of a still picture or a motion picture to which the positional information acquired by the GNSS reception unit 214, voice information (may be text information acquired by performing voice to text conversion by the main control unit or the like) acquired by the microphone 206, attitude information acquired by the motion sensor unit 215, or the like is added can be stored in the storage unit 212 or be output through the external input-output unit 213 or the wireless communication unit 210.

Even in the smartphone 200 having the above configuration, image shake correction can be performed with high accuracy by detecting a position of the imaging element with high accuracy.

As described so far, the magnet 52 and the magnet 53 are disposed in the fixed unit 50, and the driving coil 62, the position sensor 63, and the electrical wiring line are disposed in the movable unit 60. However, it is also possible to provide a configuration in which the magnet 52 and the magnet 53 are disposed in the movable unit 60 and the driving coil 62, the position sensor 63, and the electrical wiring line are disposed in the fixed unit 50.

In addition, as described so far, the camera body 10 of the digital camera 1 performs image shake correction by moving the imaging element 12. The digital camera 1 may perform image shake correction by moving a vibration-proof lens included in the imaging optical system 30 of the lens device 20 instead of moving the imaging element 12. In this case, the configuration illustrated in FIG. 2 may be employed as a structure for driving of the vibration-proof lens and position detection.

In addition, in the configuration examples illustrated in FIG. 4 to FIG. 6, the first loop pattern is in contact with the second loop pattern at one point P1 in a plan view. However, the first loop pattern may also be configured to be in contact with the second loop pattern at a line instead of a point.

Figure 10:
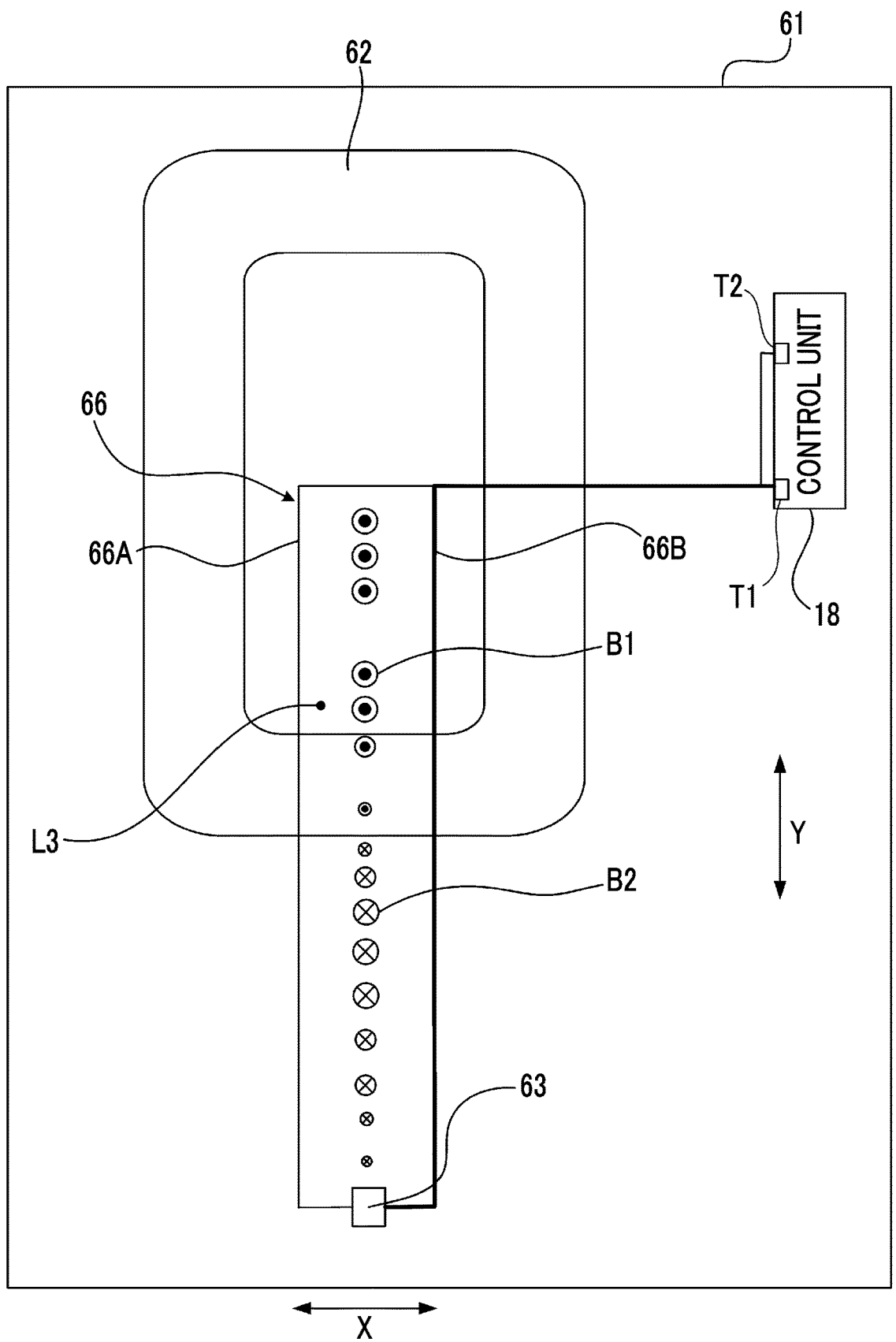
FIG. 10 is a schematic diagram that illustrates a configuration example in a case of arranging the position sensor 63 outside a driving coil 62 in the configuration of the electrical wiring line illustrated in FIG. 7 and corresponds to FIG. 4.

In addition, while the position sensor 63 is arranged on the inner side of the driving coil 62, the position sensor 63 may be arranged on the outer side of the driving coil 62. In this case, for example, the electrical wiring line 64 and the electrical wiring line 65 illustrated in FIG. 4 to FIG. 6 are arranged on the outer side of the driving coil 62. A shape and arrangement of each loop pattern is decided such that a magnetic flux in the first loop pattern approximately matches a magnetic flux in the second loop pattern. In the modification example illustrated in FIG. 7, for example, as illustrated in FIG. 10, the wiring line 66A and the wiring line 66B may be formed in different layers and be connected to the control unit 18 after overlapping with each other in the middle thereof.

As described above, at least the following matters are disclosed in the present specification. While corresponding constituents and the like in the embodiment are shown in parentheses, the present invention is not limited thereto.

(1) A drive device comprising a magnet (the magnet 52 and the magnet 53), a coil and a position sensor (the driving coil 62 and the position sensor 63) that receive an action from the magnet, a first electrical wiring line (the wiring line region 64A and the wiring line region 65A) that passes through the position sensor and causes first electromotive force to occur by causing a current to flow in the coil, a second electrical wiring line (the wiring line region 64B and the wiring line region 65B) that causes second electromotive force which is electromotive force in an opposite direction to the first electromotive force to occur by causing the current to flow in the coil, and a processor (control unit 18) configured to control the current flowing in the coil based on an output of the position sensor.

(2) The drive device according to (1), in which the first electrical wiring line forms a first loop pattern, and the second electrical wiring line forms a second loop pattern.

(3) The drive device according to (2), in which out of magnetic flux lines generated by causing the current to flow in the coil, an integrated value (magnetic flux $\varphi_{L1}$) of a magnetic flux line passing through the first loop pattern approximately matches an integrated value (magnetic flux $\varphi_{L2}$) of a magnetic flux line passing through the second loop pattern.

(4) The drive device according to (2) or (3), in which the first electrical wiring line is electrically connected to the second electrical wiring line.

(5) The drive device according to (4), in which in a state of a view in a direction (direction Z) of a magnetic flux line passing through the coil, the first electrical wiring line is in contact with the second electrical wiring line at a point (point P1) or a line.

(6) The drive device according to any one of (2) to (5), in which in a state of a view in a direction (direction Z) of a magnetic flux line passing through the coil, an area of the first loop pattern approximately matches an area of the second loop pattern.

(7) The drive device according to any one of (2) to (6), in which the position sensor is arranged on an inner side of the coil, in a state of a view in a direction (direction Z) of a magnetic flux line passing through the coil.

(8) The drive device according to (7), in which in a state of a view in the direction (direction Z) of the magnetic flux line passing through the coil, the first loop pattern and the second loop pattern are arranged on the inner side of the coil.

(9) The drive device according to (7), in which in a state of a view in the direction (direction Z) of the magnetic flux line passing through the coil, the first loop pattern and the second loop pattern are arranged on an inner side of an outer edge of the coil and partially overlap with the coil.

(10) The drive device according to any one of (1) to (9), in which the first electrical wiring line and the second electrical wiring line are differential output wiring lines of the position sensor.

(11) A drive device comprising a magnet (the magnet 52 and the magnet 53), a coil and a position sensor (the driving coil 62 and the position sensor 63) that receive an action from the magnet, an electrical wiring line (electrical wiring line 66) that passes through the position sensor and extends from an inner side of the coil to an outer side of the coil, and a processor (control unit 18) configured to control a current flowing in the coil based on an output of the position sensor, in which electromotive force occurring by the electrical wiring line by causing the current to flow in the coil is less than or equal to a threshold value.

(12) The drive device according to (11), in which the electrical wiring line forms a loop pattern.

(13) The drive device according to (12), in which an integrated value (magnetic flux $\varphi_{L3}$) of a magnetic flux line passing through the loop pattern by causing the current to flow in the coil is less than or equal to a threshold value.

(14) The drive device according to (12) or (13), in which in a state of a view in a direction (direction Z) of a magnetic flux line passing through the coil, an area (first area) of a region on an outer side of the coil in the loop pattern is larger than an area (second area) of a region on an inner side of an outer edge of the coil in the loop pattern.

(15) The drive device according to any one of (11) to (14), in which the position sensor is arranged on an inner side of the coil, in a state of a view in a direction (direction Z) of a magnetic flux line passing through the coil.

(16) The drive device according to any one of (11) to (15), in which the electrical wiring line is a differential output wiring line of the position sensor.

(17) An imaging apparatus (digital camera 1) comprising the drive device according to any one of (1) to (16).

EXPLANATION OF REFERENCES

1: digital camera
10: camera body
11: driver
12: imaging element
13: imaging element shift mechanism
14: imaging element drive unit
15: display unit
16: memory
17: vibration detector
18: control unit
19: recording medium
20: lens device
30: imaging optical system
31: imaging lens
40: lens control unit
50: fixed unit
51: flat member
52, 53: magnet
60: movable unit
61: flexible substrate
62: driving coil
63: position sensor
64, 65: electrical wiring line
64A, 64B, 65A, 65B: wiring line region
66: electrical wiring line
66A, 66B: wiring line
L1, L2, L3: closed region
P1: point
T1, T2: input terminal
B1, B2: coil magnetic flux line
R1: range
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit

What is claimed is:

1. A drive device comprising:
a magnet;
a coil and a position sensor each of which receives an action from the magnet;
a first electrical wiring line that passes through the position sensor and causes first electromotive force to occur by causing an electric current to flow in the coil;
a second electrical wiring line that causes second electromotive force, which is electromotive force in an opposite direction to the first electromotive force, to occur by causing the electric current to flow in the coil; and
a processor configured to control the electric current flowing in the coil based on an output of the position sensor.

2. The drive device according to claim 1,
wherein the first electrical wiring line forms a first loop pattern, and
the second electrical wiring line forms a second loop pattern.

3. The drive device according to claim 2,
wherein, among magnetic flux lines generated by causing the electric current to flow in the coil, an integrated value of a magnetic flux line passing through the first loop pattern approximately matches an integrated value of a magnetic flux line passing through the second loop pattern.

4. The drive device according to claim 2,
wherein the first electrical wiring line is electrically connected to the second electrical wiring line.

5. The drive device according to claim 4,
wherein in a state of a view in a direction of a magnetic flux line passing through the coil, the first electrical wiring line is in contact with the second electrical wiring line at a point or a line.

6. The drive device according to claim 2,
wherein in a state of a view in a direction of a magnetic flux line passing through the coil, an area of the first loop pattern approximately matches an area of the second loop pattern.

7. The drive device according to claim 2,
wherein the position sensor is arranged at an inner side of the coil, in a state of a view in a direction of a magnetic flux line passing through the coil.

8. The drive device according to claim 7,
wherein in a state of a view in the direction of the magnetic flux line passing through the coil, the first loop pattern and the second loop pattern are arranged at the inner side of the coil.

9. The drive device according to claim 7,
wherein in a state of a view in the direction of the magnetic flux line passing through the coil, the first loop pattern and the second loop pattern are arranged at an inner side of an outer edge of the coil and partially overlap with the coil.

10. The drive device according to claim 1,
wherein the first electrical wiring line and the second electrical wiring line are differential output wiring lines of the position sensor.

11. A drive device comprising:
a magnet;
a coil and a position sensor each of which receives an action from the magnet;
an electrical wiring line that passes through the position sensor and extends from an inner side of the coil to an outer side of the coil; and
a processor configured to control an electric current flowing in the coil based on an output of the position sensor.

12. The drive device according to claim 11,
wherein the electrical wiring line forms a loop pattern.

13. The drive device according to claim 12,
wherein an integrated value of a magnetic flux line passing through the loop pattern by causing the electric current to flow in the coil is less than or equal to a threshold value.

14. The drive device according to claim 12,
wherein in a state of a view in a direction of a magnetic flux line passing through the coil, an area of a region at an outer side of the coil in the loop pattern is larger than an area of a region at an inner side of an outer edge of the coil in the loop pattern.

15. The drive device according to claim 11,
wherein the position sensor is arranged at an inner side of the coil, in a state of a view in a direction of a magnetic flux line passing through the coil.

16. The drive device according to claim 11,
wherein the electrical wiring line is a differential output wiring line of the position sensor.

17. An imaging apparatus comprising:
the drive device according to claim 1.

* * * * *